(12) United States Patent
Moddemeijer

(10) Patent No.: US 6,241,885 B1
(45) Date of Patent: Jun. 5, 2001

(54) FILTER CHAMBER

(76) Inventor: Pieter J. H. Moddemeijer, 4124 S. Jackson St., Amarillo, TX (US) 79110

( * ) Notice: Subject to any disclaimer, the term of this patent is extended or adjusted under 35 U.S.C. 154(b) by 0 days.

(21) Appl. No.: 09/302,132

(22) Filed: Apr. 29, 1999

(51) Int. Cl.⁷ .................................................. B01D 27/06
(52) U.S. Cl. .......................................... 210/232; 210/348
(58) Field of Search ..................................... 210/232, 348

(56) References Cited

U.S. PATENT DOCUMENTS

| | | |
|---|---|---|
| 1,941,895 | 1/1934 | O Hennings . |
| 4,052,317 | 10/1977 | Palnik . |
| 4,725,323 | 2/1988 | Ostreicher et al. . |
| 4,728,421 | 3/1988 | Moddemeyer . |
| 5,173,186 | 12/1992 | Spafford et al. . |
| 5,770,066 | 6/1998 | Coates . |

*Primary Examiner*—Chester T. Barry
(74) *Attorney, Agent, or Firm*—Arthur F Zobal

(57) ABSTRACT

The apparatus comprises a housing having an inlet and an outlet. The apparatus uses a single central rod coupled to one end of the housing. A support member is coupled to the other end of the rod. The support member has a plurality of threaded apertures extending therethrough through which threaded members are screwed for use for holding annular filter members in place. The support member and threaded members may be used at either end of the housing to hold the filter members in place. In several embodiments, the threaded members have convex, conical shaped ends which mate with concave conical shaped surfaces of seal members which act to center and seal the ends of the annular filter members.

15 Claims, 4 Drawing Sheets

FILTER CHAMBER

BACKGROUND OF THE INVENTION

1. Field of the Invention

The invention relates to the filter chamber having a plurality of annular filter elements located therein for filtering liquids.

2. Description of the Prior Art

Hollow cylindrical filter elements have been used for filtering liquids such as water, acids, etc. to remove waster materials therefrom.

The lengths of these filter elements obtained commercially vary for example as much as ½ of an inch.

Known prior art devices have employed a plurality of these elements in a filter chamber. Some of these prior art devices use rods secured to a lower manifold and which rods extend through the filter elements. Nuts are provided with an annular knife edge that are screwed to the upper ends of the rods, and which forms seals with the upper ends of the filter elements. The use of rods which extend through the filter elements results in a large pressure drop between the inlet and outlet which requires a large pump to pump the liquid through the filter device. Other known prior art devices use individual plastic springs for urging closure means with annular knife edges against the upper ends of the annular filters for closing the top openings thereof. These springs, however, tend to break and are difficult to replace.

U.S. Pat. Nos. 1,941,895, 4,052,317, 4,725,323, 4,728,421, 5,173,186, and 5,770,066 discloses other prior art filter apparatus.

SUMMARY OF THE INVENTION

It is an object of the invention to provide a new and useful filter apparatus which employs a plurality of annular filter members in a housing chamber with a new and useful arrangement for effectively holding the plurality of annular filter elements in place in the housing chamber.

The apparatus comprises a housing having an inlet and an outlet. The apparatus uses a single central rod coupled to one end of the housing. A support member is coupled to the other end of the rod. The support member has a plurality of threaded apertures extending therethrough through which threaded members are screwed for use for holding the filter members in place. The support member and threaded members may be used at either end of the housing to hold the filter members in place.

In several embodiments, the threaded members have convex, conical shaped ends which mate with concave conical shaped surfaces of seal members which act to center and seal the ends of the annular filter elements.

DESCRIPTION OF THE PREFERRED EMBODIMENTS

Figure 1:
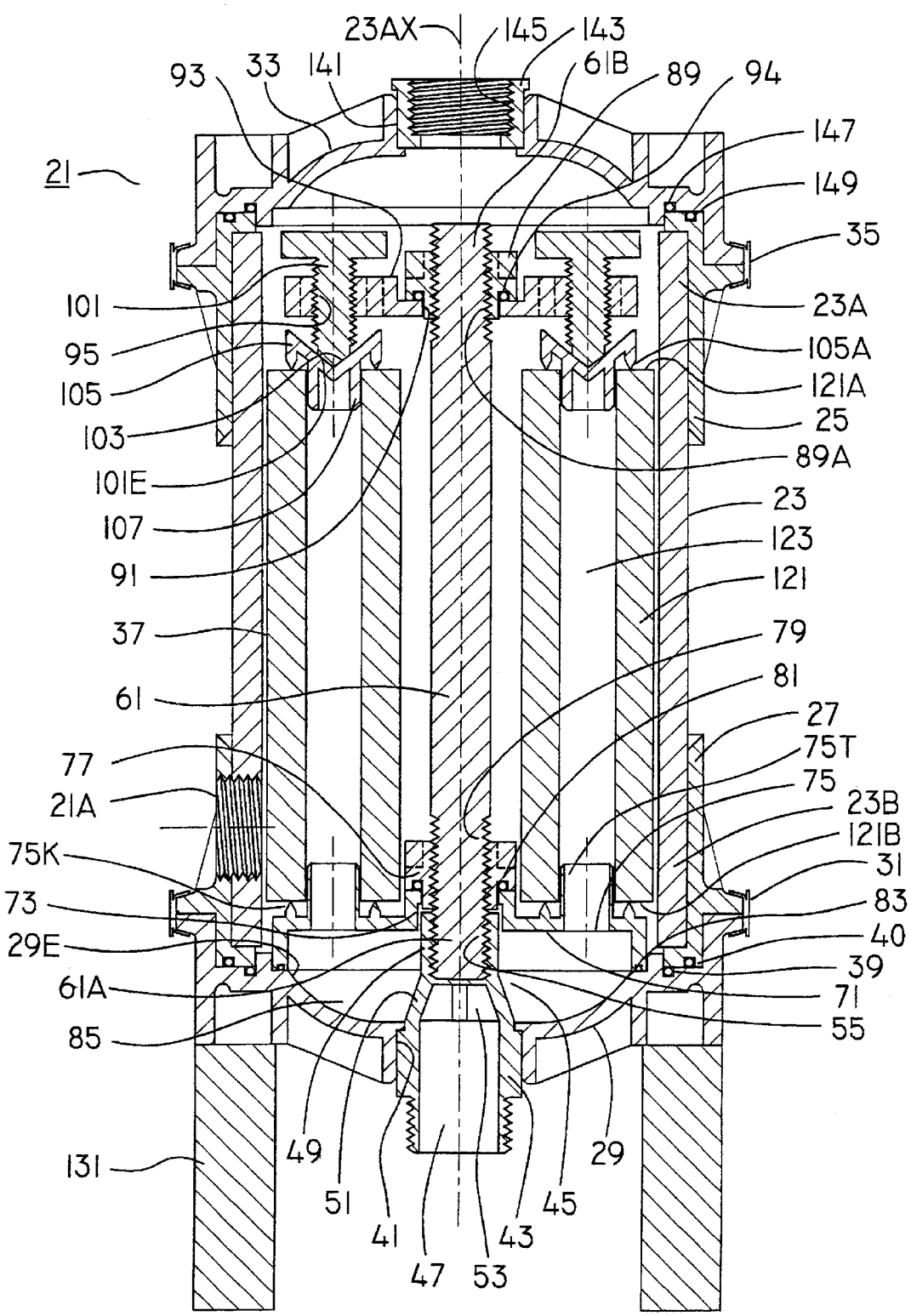
FIG. 1 is a cross sectional view of one embodiment of the filter apparatus of the invention.
Figure 2:
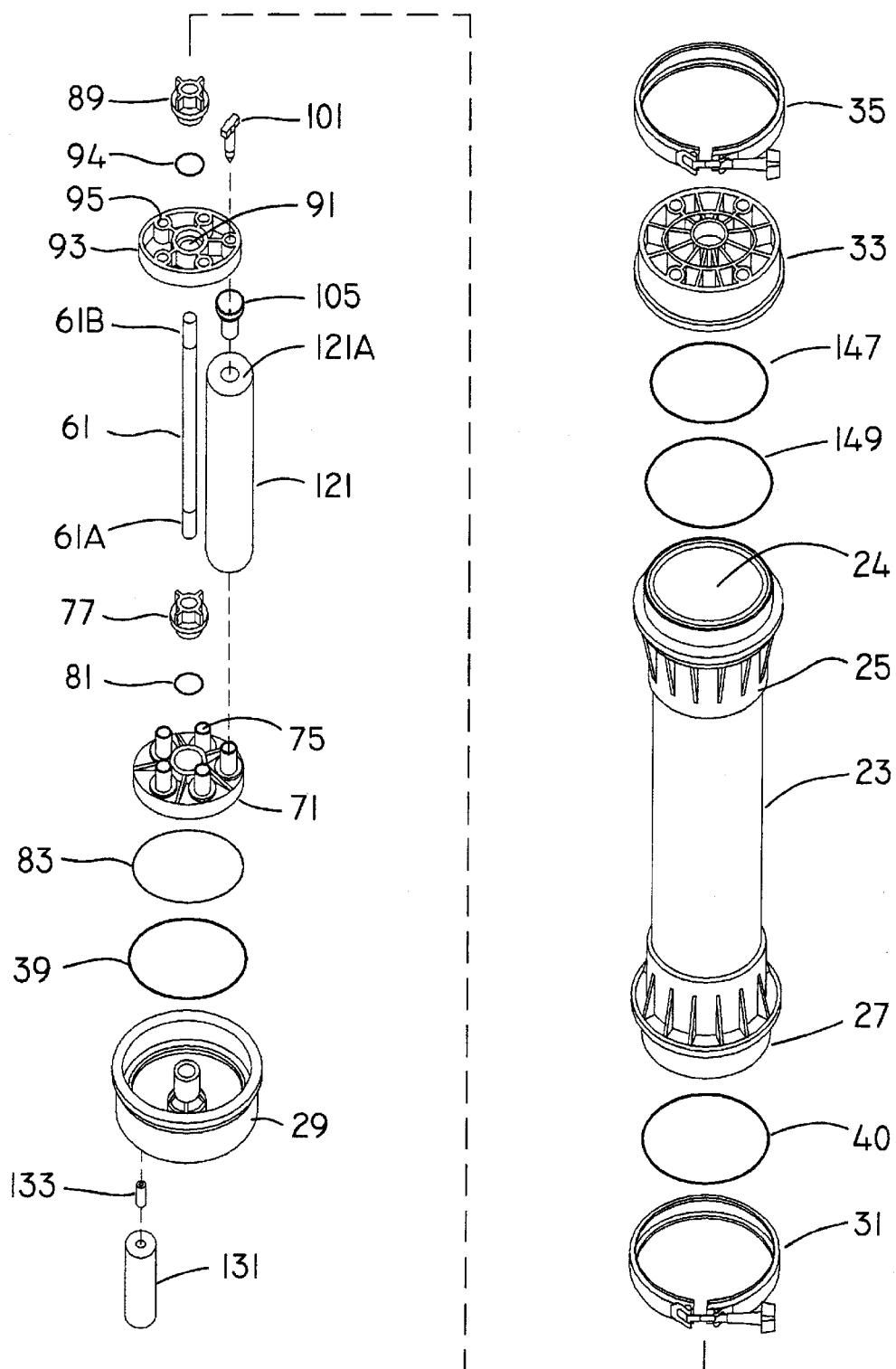
FIG. 2 is an exploded view of the apparatus of FIG. 1.

Referring now to FIGS. 1 and 2 of the drawings, the filter apparatus of one embodiment of the invention is identified at 21. It comprises tubular or annular wall structure 23 defining a main chamber 37 in which are located a plurality of tubular filter elements 121 for filtering material out of a liquid which is pumped into the chamber 37 through an inlet 21A. The liquid passes through the walls of the filter elements 121 into their interior openings 123, through openings 75 formed through a lower manifold 71, into a lower chamber 85, and out of a lower outlet 47. The apparatus comprises a unique arrangement for supporting and sealing the upper ends 121A and lower ends 121B of the tubular filter elements 121.

The apparatus 21 comprises a hollow cylindrical housing member 23 having a central openings 24 formed therethrough between ends 23A and 23B. Flanges 25 and 27 are secured around the ends 23A, and 23B preferably with glue. A round cup shaped bottom wall 29 is removably secured to the lower end of flange 23B with a clamp 31. A top wall 33 is removably secured to the upper end of the flange 23A with a clamp 35 to form the main chamber 37 in which the filter elements 121 are removably supported. Four legs 131 are secured to the outer lower end of the bottom wall 29 with set screws 133. Members 39 and 40 are O-ring seals.

An aperture 41 is formed through the central portion of the wall 29 for receiving the lower portion 43 of a retainer rod holder 45 which is glued in the aperture 41. The lower portion 43 has an aperture 47 formed therethrough and which is connected to an upper portion 49 by four angularly spaced apart connecting members 51 which form slots 53 leading to the aperture 47. The upper portion 49 has a threaded aperture 55 into which is screwed the threaded end 61A of a rod 61. The rod 61 extends along the axis 23A of the wall 23.

A round manifold 71 has formed therethrough a central aperture 73 and five openings 75 equally spaced around the aperture 73 for providing five liquid flow paths through the manifold. The center lines of adjacent apertures 75 define an angle of 72° relative to the center line of the aperture 73. The central aperture 73 receives the upper end 49 of the rod holder 45, the threaded end 61A of the rod 61 and a nut 77, which has a threaded aperture 79 which is screwed to the threads 61A of the rod 61. The nut 77 locks the manifold 71 in place against the outer edge 29E of the wall 29 as shown in FIG. 1. Members 81 and 83 are O-ring seals. The wall 29 and the manifold 71 define the lower end chamber 85 below the rod 61.

The upper side of the manifold 71 has short upward extending tubular members 75T surrounding the apertures 75. The upper side of the manifold 71 also has annular upward extending sharp or knife edges 75K spaced from and surrounding each tubular member 75T.

The rod 61 is supported along the axis 23AX of the tubular wall 23 and has an upper threaded end 61B. A nut 89 having a threaded aperture 89A is screwed to the threaded end 61B of the rod 61. The nut 89 fits through an aperture 91 of a round compressor plate 93 and engages the plate 93. An O-ring 94 is provided for reliancy purposes to compensate for expansion and contraction of the rod 61 due to temperature variations and is not used for sealing purposes. The plate 93 has five threaded apertures 95 formed therethrough around the aperture 91 and spaced outward therefrom. The center lines of adjacent apertures 95 define an angle of 72° relative to the center line of the aperture 91. The apertures 75 and 95 are spaced radially from the axis 23A the same distance. Screwed through each aperture 95 is bolt 101 having a convex, conical shaped end 101E which fits into a mating concave, conical shaped surface 103 of a knife edge sealing member 105.

The purpose of the plate 93, the bolts 101, the knife edge members 105, the lower tubular members 75T and the knife edge members 75K is to support and seal the ends 121A and 121B of the filter elements 121. In this respect, the lower ends 121B of the filter elements 121 are fitted against the lower annular knife edges 75T with the tubular members 75T extending into the lower portions of the filter element openings 123. The members 105 have bushing ends 107 which fit into the upper portions of the openings 123 of the filter member 121 and annular knife edges 105A which engage the ends 121A of the filter elements 121 and form a seal with the filter element ends 121A. The bolts 101 can be tightened to achieve the same compression force on each individual filter element 121 even though the lengths of the filter elements may vary. The conical shaped ends 101E of the bolts 101 and the conical shaped surfaces 103 of the knife edge sealing members 105 facilitate centering of the filter elements 121. The bolts 101 are readily adjustable to obtain the desired seal and are sufficiently strong such that they do not readily break. The filter elements 121 can be readily replaced by removing the clamp 35 and the upper wall 33, removing rod nut 89 and plate 93 including the bolts 101 and the filter elements 121, inserting new filter elements 121, reattaching the nut 89 and plate 93 and securing the filter elements 121 in place with the knife edge members 105, and bolts 101 and attaching and clamping the upper wall 33 in place.

In operation, the outlet of a pump (not shown) is coupled to the inlet 21A of the housing wall 23 to pump the liquid to be filtered into the chamber 37. The liquid flows through the walls of the filter elements 121 into their central openings 123, through the manifold openings 75, into the chamber 85, and through the outlet 47 to a device (not shown) to recover the liquid. The filter elements 121 remove the unwanted materials from the liquid.

The top 33 of the apparatus 21 has an opening 141 formed therethrough in which is glued a member 143 having a threaded aperture 145 to which a bleed off valve and pressure gauge is coupled. Members 147 and 149 are O-ring seals.

Figure 3:
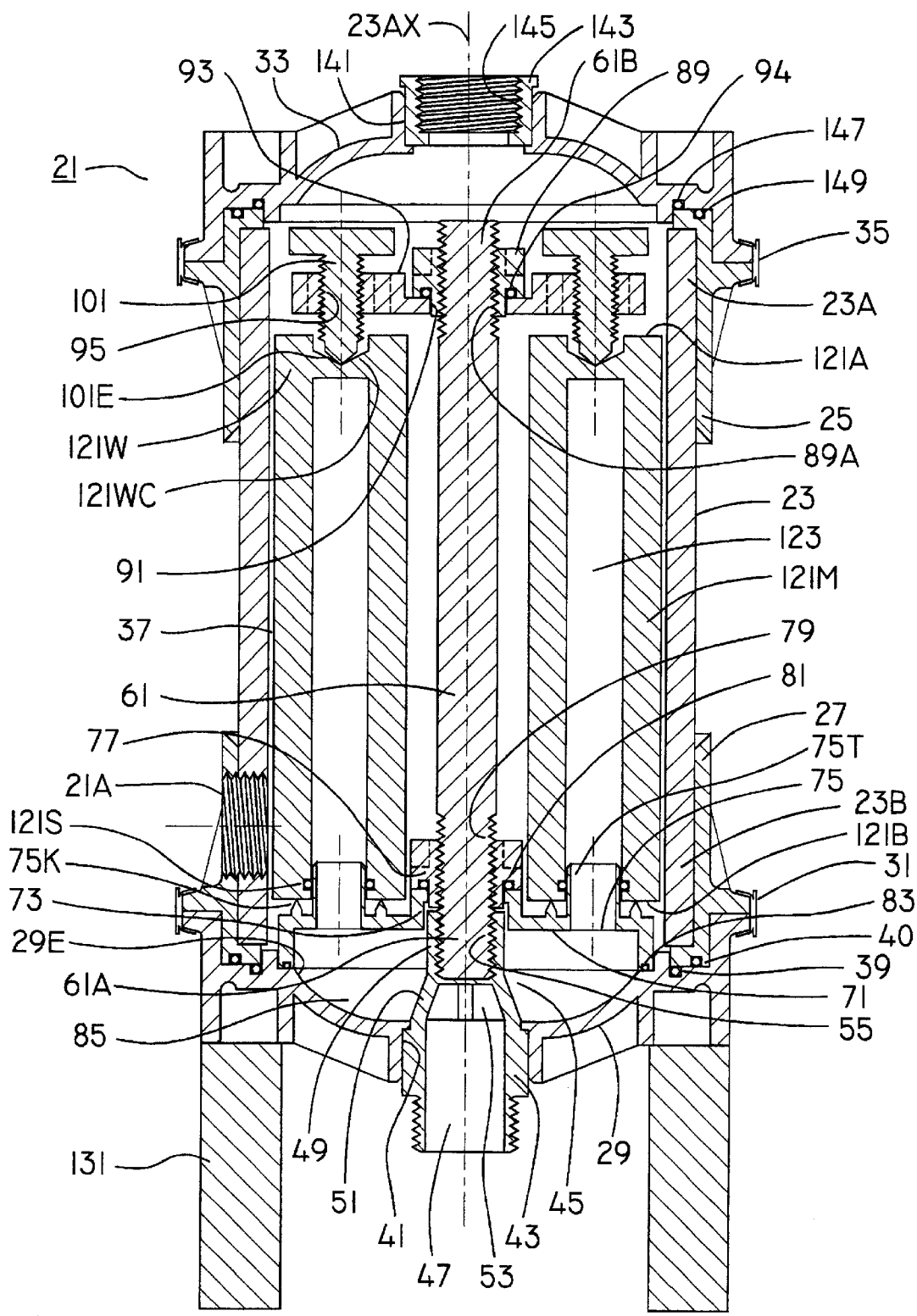
FIG. 3 is a cross-sectional view of another embodiment of the filter apparatus wherein the filter elements employed have only one open end.

Referring now to FIG. 3, the embodiment therein is the same as that of FIGS. 1 and 2 except that the filter elements have one closed end and the seal means 105 are not employed. In FIG. 3, like elements are identified by the same reference numerals as in FIGS. 1 and 2. In FIG. 3, the annular filter elements 121M are submicron members and have closure walls 121W at ends 121A which are engaged by the conical ends 101 E of the bolts 101 to urge the ends 121B against the annular knife edges 75K. O-ring seals 121S located in annular interior slots form seals between the inside lower ends of the elements 121M and the outsides of tubular members 75T. The upper surfaces 121WC are concave or recessed for receiving the ends 101E of the bolts 101. The apparatus of FIG. 3 operates in the same manner as that of the apparatus of FIGS. 1 and 2 in the filtering process.

Figure 4:
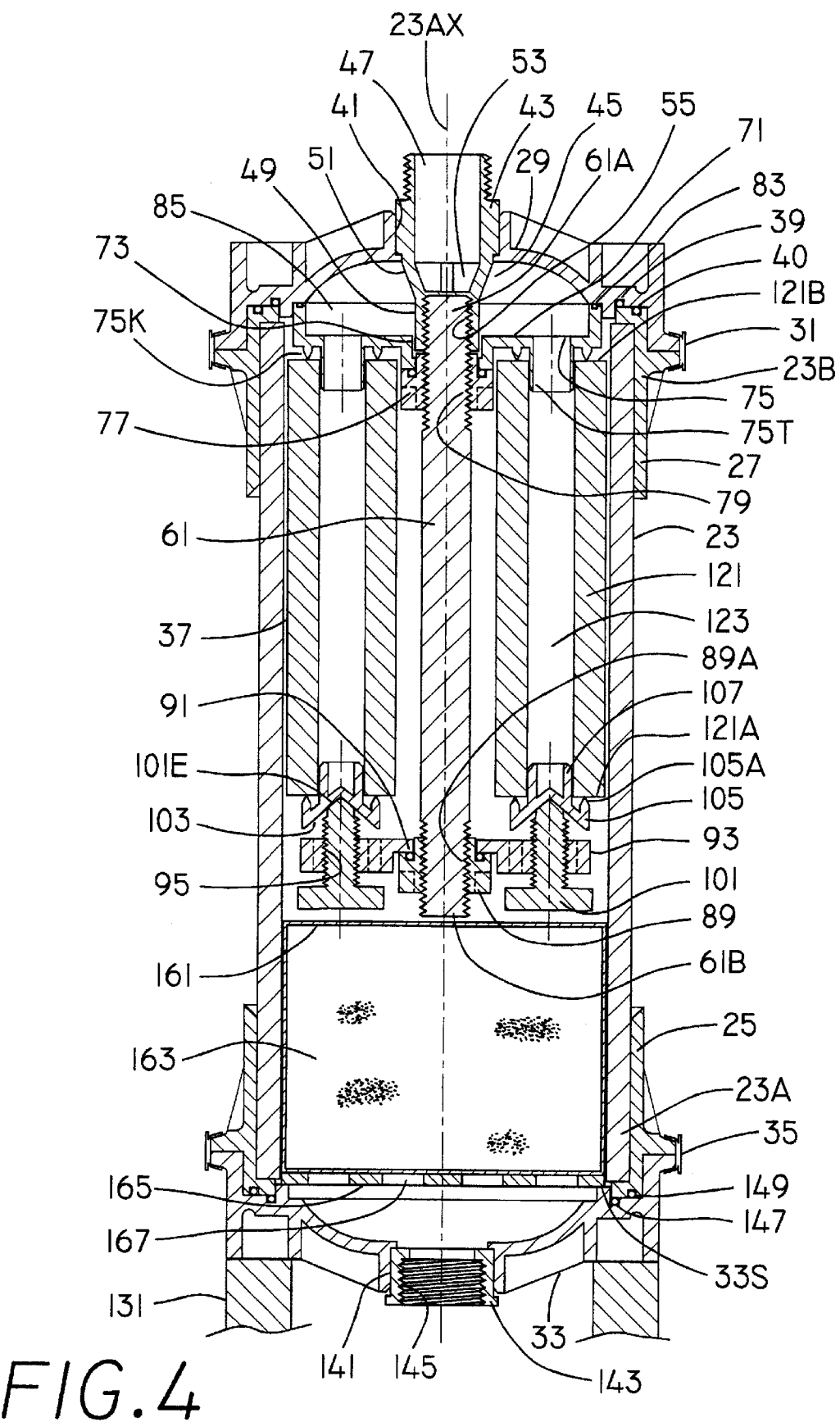
FIG. 4 is a cross-sectional view of still another embodiment of the filter apparatus wherein the inlet and outlets and the filter element holding system are reversed.

Referring now to FIG. 4, the embodiment therein will be described. In FIG. 4, like reference numerals identify like components as disclosed in FIGS. 1 and 2. The embodiment of FIG. 4 is similar to that of FIGS. 1 and 2 except that the tubular member 23 is longer and the member 23, manifold 71, the wall 29, clamps 31 and 35, filter members 121, the rod 61, the compression plate 93, the seals 105, the wall 35 and the legs 131 have been reversed in position such that the lower opening 145 forms the inlet and the upper opening 47 forms the outlet. In addition, the inlet aperture 21A is not employed in the tubular member 23. Also provided is a bag or container, 161 containing small granular particles of carbon 163 for filtering purposes. The container 161 is supported on a plate 165 with apertures 167 formed therethrough below the filter elements 121. The plate 165 is supported on a shoulder 33S of the wall 33. The walls of the container 161 are porous to the liquid to be filtered.

In operation of the apparatus, a pump is coupled to inlet 145 and liquid is pumped into the chamber which flows through the plate openings 167, through the lower wall of the bag 161, through the carbon particles 163 through the upper wall of the bag 161, through the walls of the filter elements 121 through the openings 123, 75 into chamber 85, through openings 53 and out of the outlet 47 to a device coupled to the outlet 47 to recover the liquid. The purpose of the filter elements 121 is to filter out any loose carbon particles that may pass through the wall of the bag 161.

All of the structural components of the apparatus preferably are formed of a suitable plastic material such as CPVC, Polypro or PVDF, except for the two clamps, the O-rings, and the tubular filter elements. These plastic materials are suitable for use of the apparatus for filtering liquids containing acid. The two clamps may be formed of stainless steel. The O-rings may be formed of a suitable elastomer. The tubular filter elements may be "String-wound", "Pleated", "Membrane" (submicron), "Sleeved", and "Single and Double" open end configuration.

The chambers of the apparatus wall have different heights and diameters to accept different standard lengths of filter cartridges 10, 20, 30, and 40 inches long. The apparatus may vary in size. For example, a six inch chamber can hold a maximum of three tubular filter elements; an eight inch chamber can hold a maximum of five tubular filter elements; a twelve inch chamber can hold a maximum of twelve tubular filter elements.

What is claimed is:

1. An apparatus for filtering liquids comprising:
  a housing comprising a side wall and first and second opposite end walls,
  a rod having a first end coupled to said first end wall and an opposite end extending toward said second end wall,
  a manifold coupled to said first end wall defining an end chamber between said manifold and said first end wall and a main chamber located between said manifold and said second end wall,
  said manifold having a plurality of manifold openings formed therethrough,
  an inlet leading to said main chamber,
  a plurality of annular filter means each having opposite spaced apart ends with an opening formed therein at least from one end of said filter means with said one ends of said filter means being coupled to said plurality of manifold openings respectively in a sealed relationship to form a plurality of flow paths from said openings of said plurality of filter means through said plurality of openings of said manifold for the flow of liquid from said openings of said filter means into said end chamber,
  an outlet formed through said first end wall,
  support means coupled to said opposite end of said rod and having a plurality of threaded openings formed therethrough, and
  a plurality of threaded means screwed through said plurality of threaded openings respectively for urging said one ends of said plurality of filter means against said manifold to form seals between said one ends of said plurality of filter means and said manifold around said plurality of flow paths.

2. The apparatus of claim 1, wherein:

each of said filter means has an opening formed therethrough between said opposite spaced apart ends of said filter means, said plurality of threaded means are screwed through said threaded openings respectively to urge seal means against the other of said ends of said plurality of filter means.

3. The apparatus of claim 2, wherein:

said first end wall comprises a lower end of said apparatus and said second end wall comprises an upper end of said apparatus.

4. The apparatus of claim 3, comprising:

a plurality of bushing means located in said openings of said other of said ends of said plurality of said filter means and having upper seal means for engaging said other of said ends of said plurality of said filter means and outward facing concave surfaces, said threaded means having convex surfaces for engaging said concave surfaces of said upper seals means respectively.

5. The apparatus of claim 4, wherein:

each of said upper seal means comprises an annular sharp edge for engaging said other of said ends of said filter means.

6. The apparatus of claim 5, wherein:

said concave surfaces comprises conical shaped surfaces, said convex surfaces comprises conical shaped surfaces.

7. An apparatus for filtering liquids, comprising:

a housing comprising side wall structure defining a main chamber having an upper end and a lower end with a central axis extending therethrough, lower wall structure coupled to said lower end, upper wall structure removably coupled to said upper end, an inlet formed through said side wall structure for the flow of liquid into said main chamber, a central rod having a lower end coupled to said lower wall structure and an upper end, a manifold coupled to said lower end of said housing above said lower wall structure defining an end chamber between said manifold and said lower wall structure, said manifold having a plurality of manifold openings formed therethrough for receiving filtered liquid for passage into said end chamber, said lower wall having an outlet opening formed therethrough for the passage of liquid from said end chamber out of said apparatus, a plurality of annular filter means each having first and second spaced apart ends with an opening formed therethrough between said first and second ends with said first ends of said plurality of filter means being coupled to said plurality of manifold opening respectively in a sealed relationship for forming a plurality of flow paths from said openings of said plurality of filter means through said plurality of manifold openings respectively for the flow of liquid into said end chamber, support means coupled to said upper end of said rod and having a plurality of threaded openings formed therethrough, and a plurality of threaded means screwed through said plurality of said threaded openings respectively for urging seal means against said second ends of said plurality of filter means for closing said openings at said second ends of said plurality of filter means.

8. The apparatus of claim 7, comprising:

a plurality of bushing means located in said openings of said second ends of said plurality of said filter means and having upper seal means for engaging said second ends of said plurality of said filter means and outward facing concave surfaces, said threaded means having convex surfaces for engaging said concave surfaces of said upper seals means respectively.

9. The apparatus of claim 8, wherein:

each of said upper seal means comprises an annular sharp edge for engaging said second ends of said filter means.

10. The apparatus of claim 9, wherein:

said concave surfaces comprises conical shaped surfaces, said convex surfaces comprises conical shaped surfaces.

11. The apparatus of claim 8, comprising:

lower seal means for forming seals around said flow paths between said manifold and said first ends of said plurality of filter means.

12. The apparatus of claim 11, wherein:

said lower seal means comprises a plurality of annular sharp edges extending from said manifold for engaging said first ends of said plurality of filter means.

13. The apparatus of claim 10, comprising:

lower seal means for forming seals around said flow paths between said manifold and said first ends of said plurality of filter means.

14. The apparatus of claim 13, wherein:

said lower seal means comprise a plurality of annular sharp edges extending from said manifold for engaging said first ends of said plurality of filter means.

15. The apparatus of claim 7, wherein:

said lower wall structure is removably coupled to said lower end.

* * * * *